June 6, 1939.    J. B. BRADSHAW    2,161,665
TOOL MOUNTING
Filed April 26, 1938    2 Sheets-Sheet 1
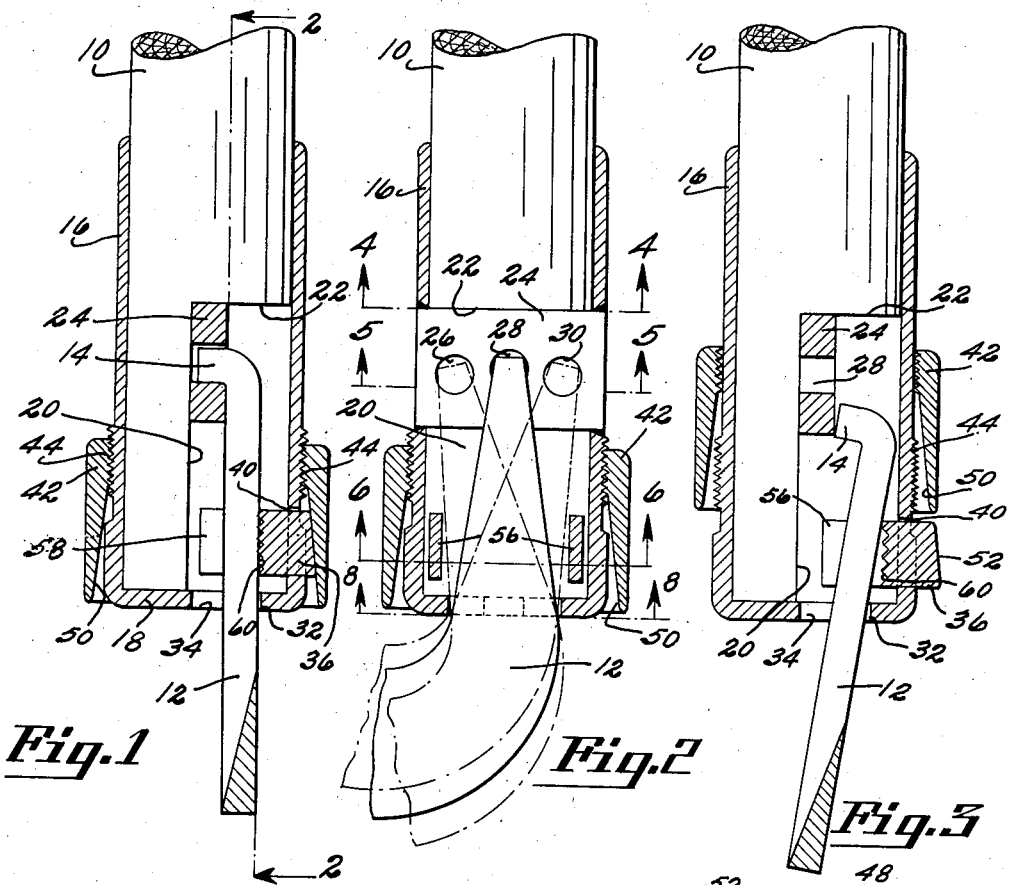
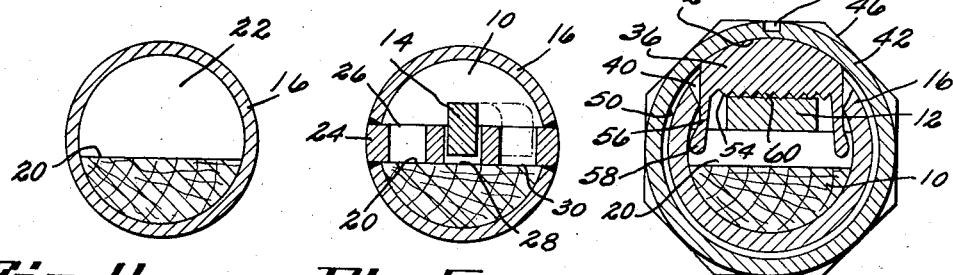
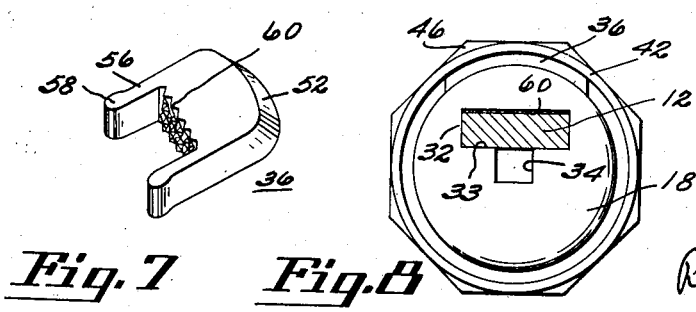
INVENTOR
JOE B. BRADSHAW
BY
Russell C. Lane
ATTORNEY June 6, 1939.  J. B. BRADSHAW  2,161,665
TOOL MOUNTING
Filed April 26, 1938  2 Sheets-Sheet 2
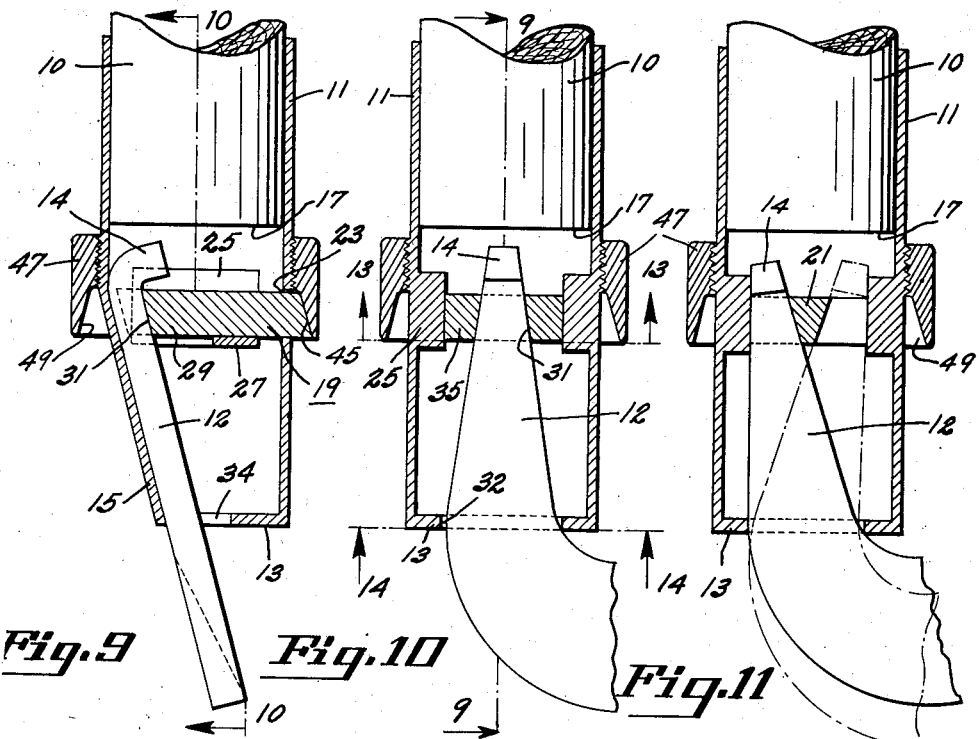
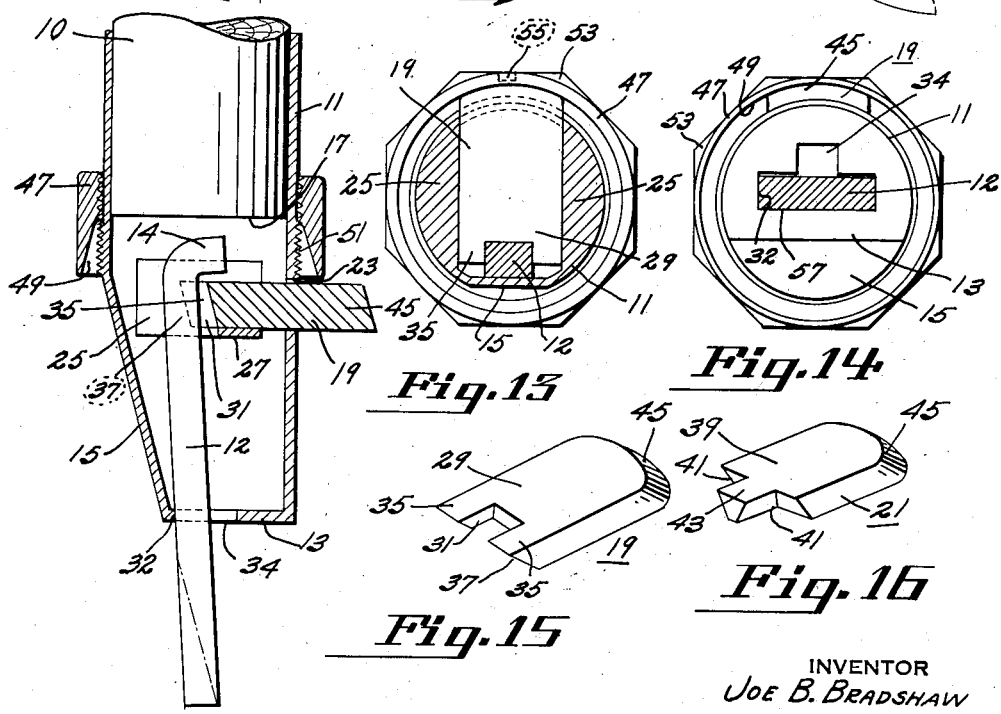
INVENTOR
JOE B. BRADSHAW
BY
Russell C. Lane
ATTORNEY Patented June 6, 1939

2,161,665

UNITED STATES PATENT OFFICE 2,161,665

TOOL MOUNTING

Joe B. Bradshaw, Stanford, Ky.

Application April 26, 1938, Serial No. 204,371

8 Claims. (Cl. 306—1.3)

This invention relates to hand operated implements, in which a removable tool is adjustably mounted on a handle, specifically a scythe blade upon a snath, and a particular object of the invention is to provide a secure but quickly and easily detachable mounting means for coupling a tanged implement to a manipulating handle.

A further object is to provide a coupling or mounting unit for the conventional scythe blade, whereby the blade securing parts are entirely enclosed, and exterior obstructions or sharp corners that might tangle with weeds or grass are entirely eliminated.

A further object is to provide a protective sheath for a blade coupling so that the parts will be protected against moisture or weather elements, and thus prolong the life of the handle and coupling.

A further object of the invention is to provide a boot or sleeve for enclosing the lower end of a scythe snath with self-contained means for securely clamping a blade in any one of several adjusted positions.

Further objects and advantages of the present invention will be apparent from the following description, reference being had to the accompanying drawings wherein a preferred embodiment of the present invention is clearly shown.

In scythe blade mountings as the prior art knows them, the blade is usually mounted on one side of the end of the snath, by clips and the like that present rough surface obstructions tending to catch or tangle in grass and weeds. Also, the usual coupling or mounting means is composed of relatively frail elements, numerous in number, that are subject to both breakage and loss. The blade supporting end of the snath was unprotected against moisture encountered in use when mowing wet material, and the intervening drying between uses.

Having in mind to overcome those objections, and to accomplish the stated objects, I enclose the end of the snath with a thin but rigid metal sleeve or shell within the end of which I insert the shank end of the blade, where I anchor the shank in a desired position. A presser member within, and movable transverse of the shell or sleeve is crowded into engagement with the blade shank, by means of a cam ring threaded upon the sleeve and engaging the end of the presser member.

In the accompanying drawings forming a part of this application:

Fig. 1 is a longitudinal section view of the preferred form of blade coupling means, with a blade clamped in position.

Fig. 2 is a longitudinal section view of the same substantially as indicated by the line and arrows 2—2 of Fig. 1.

Fig. 3 is a sectional view similar to Fig. 1, showing the parts in loosely assembled relation, and with the blade in a partially inserted position.

Fig. 4 is a transverse sectional view through the snath and blade mounting sleeve substantially as indicated by the line and arrows 4—4 of Fig. 2.

Fig. 5 is a transverse sectional view through the blade anchoring means substantially as indicated by the line and arrows 5—5 of Fig. 2.

Fig. 6 is a transverse sectional view through the blade pressing means, substantially as indicated by the line and arrows 6—6 of Fig. 2.

Fig. 7 is a perspective view of the blade presser member.

Fig. 8 is an end view of the coupling unit, showing the blade shank in section, substantially as indicated by the line and arrows 8—8 of Fig. 2.

Figs. 9 to 16, illustrate a modified form of coupling member, wherein Fig. 9 is a longitudinal sectional view of the shell and blade holding means with the blade shank in elevation substantially as indicated by the line and arrows 9—9 of Fig. 10.

Fig. 10 is a longitudinal sectional view as indicated by the line and arrows 10—10 of Fig. 9, the blade shank being shown in plan.

Fig. 11 is a similar sectional view, illustrating the blade shank in an adjusted position, and a modified form of presser member for locking the blade shank in either of two positions.

Fig. 12 is a sectional view similar to Fig. 9, but illustrating a step, and the relation of the parts when a blade shank is being assembled in locking position.

Fig. 13 is a transverse sectional view through the mounting unit, substantially as indicated by the line and arrows 13—13 of Fig. 10.

Fig. 14 is an end view of the same, with the blade shank in section, substantially as indicated by the line and arrows 14—14 of Fig. 10.

Fig. 15 is a detail view in perspective illustrating the presser member contributing to the assembly shown in Figs. 9 and 10.

Fig. 16 is a similar view illustrating the presser member contributing to the assembly shown in Fig. 11.

With particular reference to the drawings, 10 indicates the end of a scythe snath for mounting a scythe blade, the latter having a shank 12 tapering down to end in a tang 14, as is the usual practice. Over the end of the snath 10, I place a shell or sleeve 16 that extends sufficiently up the snath to form a strong support, and where it may be secured by a pin, or screw or similar device to prevent its accidental or unwanted removal therefrom. The sleeve is somewhat in the form of a boat or other structure having an end member 18, when assembled in position substantially encloses the end of the snath as shown.

The extreme end of the snath 10 is notched or cut away so as to leave the flat 20 joining a shoulder 22, the flat portion 20 extending to the bottom of the sleeve where it engages the end wall 18. Across the sleeve 16 I secure a bar or plate 24 that engages against the flat 20 and shoulder 22 of the snath, and prevents rotation of the sleeve relative to the snath. The plate 24 is provided with three apertures 26, 28 and 30, each of which is adapted to receive the tang 14 of the blade shank 12, and thereby provide selective means determining the pitch of the blade relative to the axis of the snath.

Through the end member 18 of the shell, I provide an aperture of T-formation, or one having the long slot 32 with a short middle branch 34, which together allow for passage of the tanged shank of the blade through the end member. Fig. 3 shows the step of inserting the blade shank, the tang 14 resting on the edge of the plate or bar 24 and about ready to be positioned in the tang receiving aperture 28. At this time, if it is so desired the tang 14 may be positioned in either of the apertures 26 or 30 instead. When the blade shank is so positioned, it is retained there, or in fact locked against shifting by means of a presser member or cam element 36 that extends laterally through an aperture 40 of the shell 16 to engage at its inner end the shank 12, while the outer end is engaged by a cam ring 42 threaded upon the outside of the shell 16, as at 44. To facilitate that threading, the ring may have flats to simulate a hexagonal or octagonal nut 46, or may have a recess 48 to accommodate a spanner wrench. I prefer that the threaded relation of the cam ring and shell be of the left hand type so that engagement with obstructions, or friction with the turf or ground while in use will tend to tighten the nut, rather than loosen it.

The cam ring 42 has its inner surface of steep conical form to provide a camming surface 50 adapted to engage a chamferred or slanting surface 52 on the outer end of the presser member 36. The presser member is also of such dimension that when its inner end engages the blade shank that the outer end will protrude far enough through the shell aperture 40 to be forceably engaged by the cam surface 50 as the cam ring is threaded toward the end of the snath. The inner end of the presser member 36 is of U-formation in section transverse to the coupling unit, substantially as shown in Figs. 6 and 7, in that a bridge portion 54 is joined at each end by the neck 56 of a bulbous leg 58, the enlargements of the latter being outwardly directed to prevent dislodgement from within the hollow shell. Thus, the presser member 36 will always be retained within the shell aperture 40 through the cam ring 42 be back of its threaded position. To insure secure gripping of the blade shank, the engaging surface of the bridge 54 is cross scored to provide ridges or tooth like members 60 that may be hardened to bight into the shank 12 when the cam ring is screwed in place. With these provisions, when the blade is in place, the cam ring is screwed up tight substantially as shown in Fig. 1, then the presser member 36 engages the blade shank at a point between the tang 14 and the part passing through the aperture 32 of the end member 18, in so doing it presses the shank against the side walls 33 of the aperture 32 and securely binds the blade shank against any consequential amount of shifting relative to the shell, and also maintains the tang 14 firmly anchored in the selected aperture 26, 28 or 30.

In the form of blade mounting shown in Figs. 9 to 16 inclusive, the snath or handle 10 is enclosed at its end by a sleeve 11 generally cylindrical in form especially for the part that extends up the snath for attachment thereto, and the lower end is closed off by the end member 13 and is provided with the T-shaped opening made up of the slot 32 and the branch 34, as in the form above described and for the same purpose, in receiving the tanged blade 12. The shell or sleeve 11 has a portion cut away and closed off by the flat member 15 so that the blade, when mounted on the handle 10, is capable of being worked close to the ground surface. The blade shank 12 when inserted in the aperture of the end plate 13 takes a position well within the hollow member adjacent the square cut end 17 of the snath, where it is anchored, the shank laying close to or engaging the inside surface of the wall 15 as shown in Fig. 9.

To anchor the blade shank, a presser member 19 or 21 is inserted in a lateral aperture 23 of the shell, and its inner end engaged with the slim end of the shank just in front of the tang 14. Fig. 12 of the drawings shows the blade shank in inserted position with the presser member 19 part way through the aperture 23 in a position to press the blade shank against the opposite wall of the sleeve. For guiding the presser member in its movement, and preventing its canting out of position, a pair of pads 25 are provided inside of the sleeve 11 to engage the edges of the presser member 19, one being placed on either side of the shell, with a bridge member or bar 27 extending across the shell on the front side of the presser member 19 to connect the pads 25.

To provide for secure holding of the blade shank the end of the presser member 19 engaging it is notched so as to extend partially around the shank as shown. In one form of the presser member, that shown in Figs. 9, 10, 12, 13 and 15, the shank engaging end 29 has a central notch 31 which, when in place straddles the blade shank in such a manner that the prongs 35 extend on opposite sides of the shank 12 and prevent its lateral shift relative to the shell. Also, the ends of the prongs 35 are chamferred off at 37 to make clearance with the slanting wall 15 of the shell. Where it is desired to provide for angular adjustment of the blade in a horizontal plane, I supply a second presser member 21, in which the shank engaging end 39 is notched at each corner 41 so as to leave the middle prong 43 therebetween. In this form, provision is made for selectively positioning the blade either to the right or to the left of the medial line of the shell, in either instance of which, the blade shank will be partially surrounded, that is on the top and one side, by the notch of the presser member. Thus, by using one or another of the presser members 19 or 21 a selection of three positions may be had for the blade.

In order to force either of the presser members into positive holding or locking engagement with the blade shank whereby it will be held against loosening or shifting, the outer end of the member protruding from the aperture 23 is provided with a cam face 45 that is located in the path of a cam ring 47 threaded upon the outside of the shell 11. The forward end of this ring is provided with a camming surface 49 that engages the cam face 45 of the presser member, and as the ring is run up on the threads 51 of the sleeve forces the presser member endwise to hold or lock the blade shank. To facilitate turning of the cam ring it may have a hexagonal or octagonal form as indicated at 53, or a recess 55 may be provided for a spanner wrench. When the parts of this embodiment are assembled the presser member 19 or 21 will engage the blade shank at a point intermediate the tang 14 and the blade and press it by force against the opposite side of the shell, and bind it against the edge 57 of the aperture in the end plate where it is held against any consequential shifting. The blade so mounted will lie substantially flat against the ground, due to the angle of the blade shank with respect to the axis of the shell and handle. In the form illustrated in Figs. 1 to 8 inclusive, I contemplate providing for a similar blade inclination, by forming an appropriate angle in the sleeve 16 so that the blade 10 may be fixed more closely parallel with the ground surface. When I fashion the sleeve 16 with such angle, then the end of the snath 10 would be cut off square, as in the form of Fig. 9, and not extend to the end member 18, as there shown. In either instance, attachment and detachment of the blade from the handle is always easily and quickly done, since the blade holding parts are always protected from elements tending to corrode them, and are always in condition to be operated. The mounting means can be tightened sufficiently by hand to hold the blade firmly in position, and any amount of usage will tend to tighten the camming ring or nut rather than loosen it.

In manufacturing the coupling, I propose to form the sleeve by either casting with all of its appointments, or rolling it up from strip stock of sufficient gauge, and then attaching the parts by either welding, hydrogen brazing or the like. I propose further to make the sleeve of stainless or non-corroding alloys so as to reduce deterioration from exposure, and make the movable parts easily workable. By using steel of light gauge, the improvements can be adopted with material increase in mass of the fixture, and yet afford a rigid and strong mounting member that is adapted to support and secure the conventional tanged blade without the slightest modification or reworking the shank element.

While the embodiment of the present invention as herein disclosed constitutes a preferred form, it is to be understood that other forms might be adopted, all coming within the scope of the claims which follow.

What is claimed is as follows:

1. In a manually operated device having a tool with a tanged shank, supported by a handle, a tool coupling, comprising in combination, a boot socketed on one end of the handle, and having an end aperture for reception of the tool shank, a bridge member within and extending across the boot, said bridge providing apertures for selectively receiving a tang of the shank, a presser bar for holding the shank in adjusted position, and means including a threaded ring exterior of the boot for forcing the presser bar against the shank.

2. The combination with a scythe snath and a blade having a tanged shank thereon, of a shell surrounding the end of the snath to protect it from the weather, and having an end aperture for reception of the blade shank, means adapted to anchor the blade shank in a selected position within the shell, said shank being disposed between the shell wall and the anchor means, a cam member operable through an opening in the shell for pressing against the blade shank in the anchored position, and means without the shell for actuating the cam member and comprising a sleeve threaded upon the shell, and having a cam surface engageable with the cam member.

3. The combination with a scythe snath and a blade having a tanged shank thereon, of a shell enclosing the end of the snath, means including an aperture in the end of the shell for inserting the blade shank within the shell, means including a presser member operable from without the shell for securing the blade shank in a selected inserted position, and a cam ring threaded on the shell for forcing the presser member against the blade shank and for protecting protuberant portions of the shell and presser member against snarling with weeds and grass.

4. The combination set forth in claim 3, wherein the presser member comprises a plate having diverging legs at either end of a notch engaging over the blade shank, and extends through an aperture in the shell to be engaged by the cam ring, said legs preventing removal of the member from the shell.

5. In a scythe, a blade mounting comprising in combination, a hollow member having an end aperture, means including said aperture for passing a blade shank within the hollow member, an apertured bar extending across the hollow member adapted to seat the blade shank in a selected position, a presser member adapted to clamp the blade shank in a selected position, and means for actuating the presser member, said presser member comprising a notched plate adapted to partially surround the blade shank and project laterally through an aperture in the hollow member.

6. In a scythe, a blade mounting comprising in combination, a hollow member having an end aperture, means including said aperture for passing a blade shank within the hollow member, an apertured bar extending across the hollow member adapted to seat the blade shank in a selected position, a presser member adapted to clamp the blade shank in a selected position, and means for actuating the presser member, said presser member having its shank engaging portion roughened to bight into the shank, for holding it in relatively non-shifting relation with respect to the hollow member.

7. In a scythe, a blade mounting comprising in combination, a hollow member having an end aperture, means including said aperture for passing a blade shank within the hollow member, an apertured bar extending across the hollow member adapted to seat the blade shank in a selected position, a presser member adapted to clamp the blade shank in a selected position, and means for actuating the presser member, said presser member being operable through an aperture in the sidewall of the hollow member, and being provided with skirts for retaining the presser member within the hollow member.

8. In a scythe, a blade mounting comprising in combination, a hollow member having an end aperture, means including said aperture for passing a blade shank within the hollow member, means for locking the blade shank in a selected position within the hollow member, said means including a notched presser member engaging about the blade shank adjacent its tanged end, and extending through an aperture in the wall of the hollow member, and a cam ring engageable with the extended end of the presser member for securely holding the blade shank in locked position against the wall of the hollow member.

JOE B. BRADSHAW.